US010976186B2

(12) United States Patent
Yamamuro

(10) Patent No.: US 10,976,186 B2
(45) Date of Patent: Apr. 13, 2021

(54) SCALE ATTACHMENT DEVICE AND LINEAR ENCODER

(71) Applicant: Mitutoyo Corporation, Kanagawa (JP)

(72) Inventor: Masataka Yamamuro, Tochigi (JP)

(73) Assignee: MITUTOYO CORPORATION, Kawasaki (JP)

( * ) Notice: Subject to any disclaimer, the term of this patent is extended or adjusted under 35 U.S.C. 154(b) by 112 days.

(21) Appl. No.: 16/361,420

(22) Filed: Mar. 22, 2019

(65) Prior Publication Data

US 2019/0323861 A1 Oct. 24, 2019

(30) Foreign Application Priority Data

Apr. 19, 2018 (JP) .............................. JP2018-080305

(51) Int. Cl.
*G01D 5/347* (2006.01)

(52) U.S. Cl.
CPC ..... *G01D 5/34707* (2013.01); *G01D 5/34746* (2013.01)

(58) Field of Classification Search
CPC ........... G01D 5/34707; G01D 5/34746; G01D 5/34753; G01B 3/1071; G01B 5/04; G01B 5/02
See application file for complete search history.

(56) References Cited

U.S. PATENT DOCUMENTS

| 4,559,707 A * | 12/1985 | Oberhans ............... G01B 21/02 33/702 |
| 5,987,768 A * | 11/1999 | Freitag ................. F16C 29/005 33/702 |
| 8,141,265 B2 * | 3/2012 | Ellin ....................... G01B 3/004 33/706 |
| 2004/0173737 A1 * | 9/2004 | Shimomura ....... G01D 5/34715 250/231.13 |
| 2006/0016089 A1 * | 1/2006 | Kawada ................. G01B 3/004 33/706 |
| 2011/0067255 A1 * | 3/2011 | Kummetz .......... G01D 5/34753 33/707 |
| 2016/0187117 A1 * | 6/2016 | Otsuka ............... G01D 5/34707 33/770 |
| 2017/0198837 A1 * | 7/2017 | Wako ........................ F16L 9/19 |

FOREIGN PATENT DOCUMENTS

| DE | 102005055513 A1 * | 5/2007 | ......... G01D 5/34707 |
| JP | 2016-126000 | 7/2016 | |

* cited by examiner

*Primary Examiner* — Thanh Luu
*Assistant Examiner* — Monica T Taba
(74) *Attorney, Agent, or Firm* — Rankin, Hill & Clark LLP

(57) ABSTRACT

A scale attachment device configured to attach a tape scale for a linear encoder includes a fixing block and housing members. The fixing block fixes the central part of the tape scale in the lengthwise direction by pressing the central part onto a target object. The housing members include a groove to house a remaining part of the scale on both sides of the fixing block. The tape scale is inserted into the groove in the lengthwise direction with its back surface facing the bottom surface of the groove of the housing member, and thus housed in the groove. The width dimension of the opening of the groove is smaller than the width dimension of the scale.

8 Claims, 6 Drawing Sheets

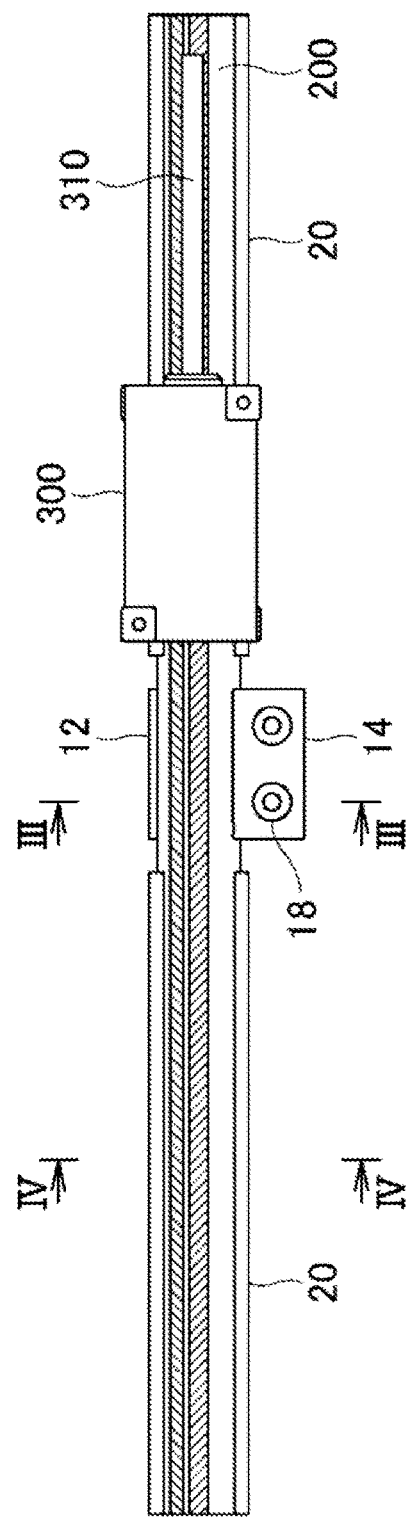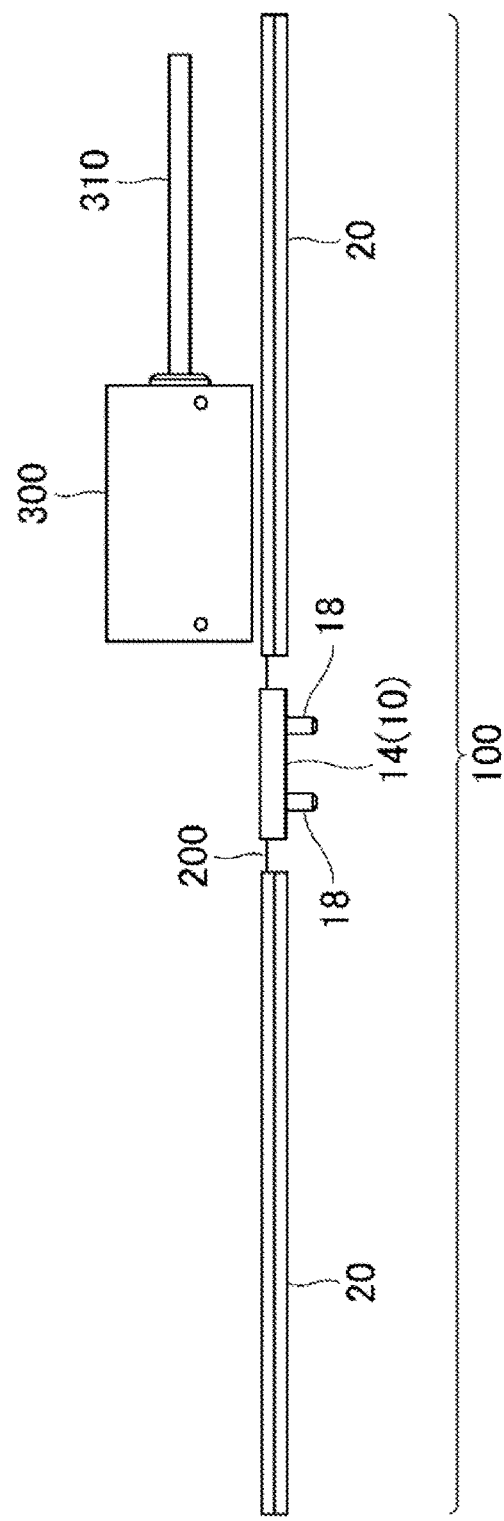

SCALE ATTACHMENT DEVICE AND LINEAR ENCODER

TECHNICAL FIELD

The present invention relates to a linear encoder configured to perform high precision measurement on the amount of movement or a position of a linear moving part of a machine tool or the like. More particularly, the invention relates to a scale attachment device configured to attach a tape scale included in the linear encoder to a target object such as a mechanical device or the like.

BACKGROUND ART

Some of the linear encoders have a configuration of separated type in which a scale is separated from a detection head. In such a separated-type linear encoder, for example, the scale is attached to a target object to be fixed and the detection head is attached to the target object to be moved. Specifically, the scale is fixed to the target object to be fixed such that the lengthwise direction of the scale goes along the moving direction, while the detection head is fixed to the target object to be moved such that a gap (clearance) from the gradations surface of the scale to the detection head has a certain value. When the target object moves, the detection head moves in the gradations direction of the scale to be able to read the gradations at any position.

For the detection head, a gap to the scale is set to reduce output variation. In addition, because an actual gap varies from the set value, an acceptable range of the gap variation is also defined to limit the output variation of the detection head within the acceptable range. The acceptable range is also called a gap tolerance, hereinafter.

Tape scales made from a thin metal are often used as a scale. Making use of flexibility of the tape scale, the tape scale can be transferred and stored in a compact form by taking up the scale. The tape scale is therefore suitable for installation work in a narrow space in comparison with a scale in a rigid body.

The characteristic of a small thickness for the tape scale may generate rattling in the thickness direction (same as the gap direction) depending on the installation method, which may make the value of the gap out of the gap tolerance. To reduce rattling, the installation method of attaching the back surface of the tape scale to the target object surface with a double-sided adhesive tape or an adhesive agent may be used. However, this method disables easiness of attachment/detachment of the tape scale.

In the scale attachment device disclosed in JP 2016-126000 A, an end of the tape scale is fixed with a fixing block, and the other end of the tape scale is fixed with a tension block with the state in which a tensile force is always generated. Applying the tensile force in the lengthwise direction of the tape scale restricts rattling in the thickness direction. In addition, unscrewing each of the blocks can separate the end part of the tape scale at any time, which satisfies the easiness of attachment/detachment of the tape scale.

CITATION LIST

Patent Literature

Patent Literature 1 JP 2016-126000 A (refer to FIG. 1)

SUMMARY OF INVENTION

Technical Problem

The scale attachment device disclosed in JP 2016-126000 A, has some issues, however, including that a tension block with a complicated structure is necessary, the mounting surface of the scale extends by the length of each of the blocks from the length of the tape scale, installation work such as adjusting the tension focus is difficult, and a large number of part items is required.

The invention aims to provide a scale attachment device and a linear encoder that satisfy, firstly, appropriate reduction of rattling of a tape scale in the thickness direction; secondly, obtaining easiness of attachment/detachment of the tape scale; thirdly, simple components and a small number of part items; and fourthly, easy installation work.

Solution to Problem

The inventors have enthusiastically studied the above-described issues to determine that only a part of the tape scale in the lengthwise direction is fixed onto a target object, and the other part is inserted into the groove of the housing member to be housed in the housing member without being fixed. The inventors then paid attention to a shape of the groove of the housing member and provided a specific shape to the groove so as to restrict rattling of the housed tape scale at least in the thickness direction. As a result, they found that a scale attachment device to attach the tape scale to the target object with an intended state can be achieved, and the invention completed.

A scale attachment device according to an embodiment of the invention is provided to attach a tape scale for a linear encoder to a target object.

The scale attachment device includes a fixing member configured to fix a part of the tape scale in the lengthwise direction by pressing the part of the tape scale onto the target object, and a housing member including a groove configured to house a remaining part of the tape scale.

The housing member is disposed next to the fixing member.

The tape scale is inserted into the groove in the lengthwise direction with the back surface of the tape scale facing the bottom surface of the groove, and thus housed in the groove.

The width dimension of the opening of the groove is smaller than the width dimension of the tape scale.

With a state in which the tape scale is housed in a housing space inside of the groove, the clearance value of the tape scale in the thickness direction is equal to or smaller than a value of gap variation acceptable for a detection head for the linear encoder, and the clearance value of the tape scale in the widthwise direction is equal to or larger than 0.1 mm.

In the embodiment of the invention, a part of the tape scale in the lengthwise direction is fixed onto a target object using the fixing member. Fixing here refers to disabling a part of the tape scale to move to the target object in the thickness direction, the widthwise direction, or the lengthwise direction.

According to this configuration, a part of the tape scale to be fixed is only a part in the lengthwise direction, and the other part is housed in the groove of the housing member without being fixed. Therefore, in comparison with attaching the whole of the back surface of the tape scale to the target object with the double-sided adhesive tape or the like, the configuration according to the embodiment of the invention allows fixing with easy attachment/detachment at any time.

In addition, the scale attachment device simply includes the fixing member that fixes a part of the tape scale in the lengthwise direction and the housing member that houses a remaining part of the tape scale. The components are simple and the number of part items is small. The installation work includes a simple procedure in which the housing member is disposed next to the fixing member side by side, the tape scale is inserted into the groove of the housing member up to a certain position, and only a part of the scale is fixed with the fixing member.

Furthermore, on the front surface of the long housing member along the tape scale, a groove to house the tape scale is formed. The groove is formed to be open on the front surface of the housing member. The width of the opening of the groove is smaller than the width of the tape scale. Therefore, the tape scale can be housed only by inserting the tape scale in the lengthwise direction to the housing space in the groove. The back surface of the tape scale housed faces the bottom surface of the groove. Here, the shape of the housing space is determined as below. The clearance of the tape scale in the thickness direction in the housing space is determined to be equal to or smaller than a value of gap variation (gap tolerance) acceptable for the detection head for the linear encoder. Determining the maximum value of the clearance in the thickness direction as described above reduces rattling of the tape scale in the thickness direction to generate, even in maximum, only rattling with a value equal to or smaller than a value of the gap tolerance. The output variation of the detection head is reduced to be small, thereby achieving high precision measurement of the linear encoder. In contrast, for the minimum value of the clearance in the thickness direction, at least a value equal to or larger than 0.01 mm is secured, whereby easiness of insertion of the tape scale into the groove is secured.

In addition, the clearance value of the tape scale in the widthwise direction in the housing space is determined to be equal to or larger than 0.1 mm to reduce the moving amount in the widthwise direction in the housing space.

The restriction of the movement of the tape scale in the lengthwise direction is provided only to the fixing member and not provided to the groove of the housing member. When the temperature of the installation target object or the ambient environment changes, displacement resulting from thermal expansion or contraction of the tape scale increases as the distance from the fixing member increases. For the effect of the thermal expansion of the tape scale on the output variation, general correction processing may be simply performed on an output value of the detection head on the scale material. The correction processing like this can be achieved accurately with the state in which the tape scale is movable to the housing member in the lengthwise direction.

In the scale attachment device according to the embodiment of the invention, the fixing member is configured to fix at least a part in the central part of the tape scale, and the housing member is disposed on both sides of the fixing member to house both side parts of the tape scale, and adhered and fixed to the target object with a double-sided adhesive tape.

With this configuration, at least a part in the central part of the tape scale in the lengthwise direction is fixed to the target object. For linear encoders, the origin of the scale for absolute measurement is often determined to be around the center. Positioning the origin to or around the fixed part of the scale minimizes misalignment of the origin resulting from thermal expansion or the like, which helps increase accuracy of measurement.

In addition, fixing the housing member with the double-sided adhesive tape to the target object substantially reduces the thickness of the housing member, in comparison with fixing with a set screw. Because the double-sided adhesive tape has elasticity in its adhesive layer, some irregularities on the mounting surface of the target object are absorbed by the adhesive layer, which helps to allow securing the flatness and the straightness of the housing member.

In the scale attachment device according to the embodiment of the invention, on the back surface of the housing member, a plurality of back surface recesses are preferably formed in parallel to each other in the lengthwise direction of the groove.

With this configuration, the back surface recesses formed on the back surface of the housing member helps remove the air bubbles that come into when affixing the double-sided adhesive tape.

In the scale attachment device according to the embodiment of the invention, on a side surface of the housing member, a side surface recess is preferably formed in the lengthwise direction of the groove.

According to this configuration, when using a fitting for anti-peel to prevent the housing member from being peeled off, the method in which a part of the fitting is locked to a recess on the side surface of the housing member is available, and the fitting itself is fixed to the target object.

A scale attachment device according to the embodiment of the invention includes a tape scale attached to a target object with the above-described scale attachment device and a detection head configured to read an optical grating on the tape scale.

The detection head constitutes a telecentric optical system, the detection head including a lens facing the optical grating, an aperture disposed on a focal position of the lens, and a light receiving element array configured to receive a detected light passed through the lens and the aperture.

According to this configuration, the optical system of the detection head is configured to be telecentric, the gap tolerance of the detection head is therefore set to a relatively large value. Therefore, combination of the detection head with the above-described properties and the scale attachment device capable of reducing the output variation of the detection achieves a configuration of an excellent linear encoder with high precision measurement being maintained and a large value of the gap to the scale.

Advantageous Effects of Invention

With the scale attachment device and the linear encoder according to an embodiment of the invention, a part to be fixed to a target object is limited to a part of a tape scale, which allows easy attachment/detachment of the tape scale. The movement amount of a non-fixed part of the tape scale in the thickness direction is reduced to a value within a gap tolerance by a housing member, which achieves high precision measurement with small output variation. The scale attachment device includes a small number of part items, which allows easy work of installation and removal.

In conventional linear encoders, a tension is applied to the tape scale, thereby reducing rattling of the scale to a value within the gap tolerance, which requires a relatively large clearance of the scale holder in the thickness direction. The linear encoder according to the embodiment of the invention is achieved through change of viewpoint in that rattling of the scale is reduced to a value within the gap tolerance using the shape and size of the groove without applying any tension to the tape scale, thereby setting a smaller value of clearance of the scale holder in the thickness direction to a certain range.

BRIEF DESCRIPTION OF DRAWINGS

FIG. 2A is a plan view of the linear encoder and FIG. 2B is a side view of the linear encoder.

DESCRIPTION OF EMBODIMENTS

Figure 1:
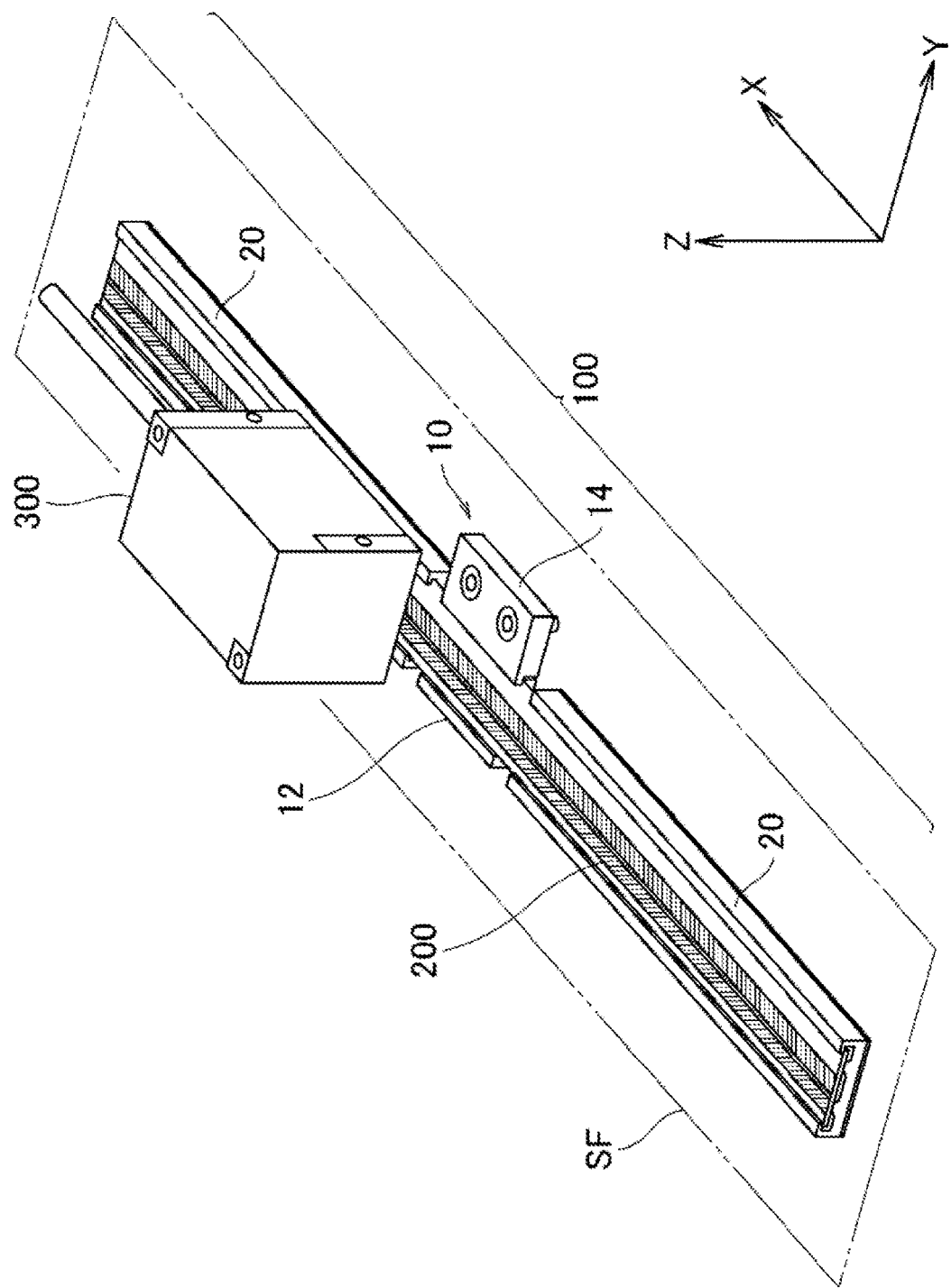
FIG. 1 is a perspective view of the entire configuration of a linear encoder according to a first embodiment of the invention.

Hereinafter, an embodiment of the invention will be described in detail with reference to the drawings. FIG. 1 is a perspective view of the entire configuration of a linear encoder according to a first embodiment. This view illustrates the state in which a tape scale 200 is attached to a mechanical device which is a target object using a scale attachment device 100, and the positional relation between the tape scale 200 and a detection head 300. FIG. 2A is a plan view of the entire configuration of the linear encoder and FIG. 2B is a side view thereof.

The linear encoder includes the scale attachment device 100, the tape scale 200, and the detection head 300. Although the external view of the mechanical device is omitted in the drawings, a scale mounting surface SF of the mechanical device is preliminarily machined to have a certain degree of flatness, and screw holes that allows the scale attachment device 100 to be screwed to the mechanical device are formed. Unless otherwise specified, a Cartesian coordinate system with the X-Y-Z axis, that is, an X-axis for the lengthwise direction, a Y-axis for the widthwise direction, and a Z-axis for the thickness direction of the scale are used for description below.

The scale attachment device 100 includes a fixing block 10 and two scale holders 20 disposed on both sides of the fixing block 10 to constitute a straight line as a whole. The fixing block 10 includes a fixing base 12, a holding member 14, and a plurality of screws 18 that fix these two members to a mounting surface.

Figure 3:
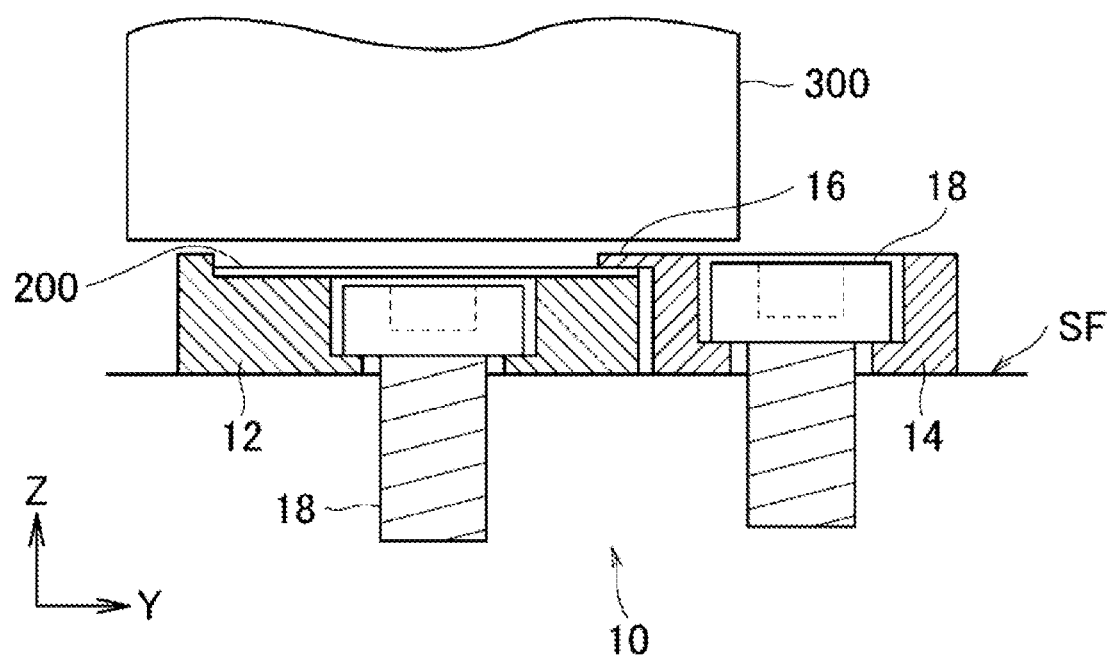
FIG. 3 is a cross-sectional view taken along in FIG. 2.

With reference to a cross-sectional view of FIG. 3, the fixing base 12 in a flat shape is screwed to the mounting surface SF using a through hole formed in the thickness direction. On the front surface of the fixing base 12, the central part of the tape scale 200 in the lengthwise direction is placed.

The holding member 14 is disposed side by side with the fixing base 12 in the widthwise direction of the scale 200, and screwed to the mounting surface SF using a through hole formed in the thickness direction. In the edge part on the fixing base 12 side on the upper surface of the holding member 14, a holding piece 16 is disposed protruding in parallel with the mounting surface SF. The holding piece 16 partially covers the gradations surface of the scale 200 on the fixing base 12. That is, the holding member 14 is fixed by the screw 18 to the mounting surface SF, and a part of the edge of the scale 200 located on the fixing base 12 is pressed by the holding piece 16 from above. The part of the edge of the scale 200 is thus sandwiched and held between the holding piece 16 and the fixing base 12. This configuration restricts movement of the central part of the tape scale 200 in any direction along X-, Y-, or Z-axis. Because the scale on the fixing base 12 is fixed by the holding member 14, the scale 200 does not need to be machined to form a hole for screwing.

Figure 4:
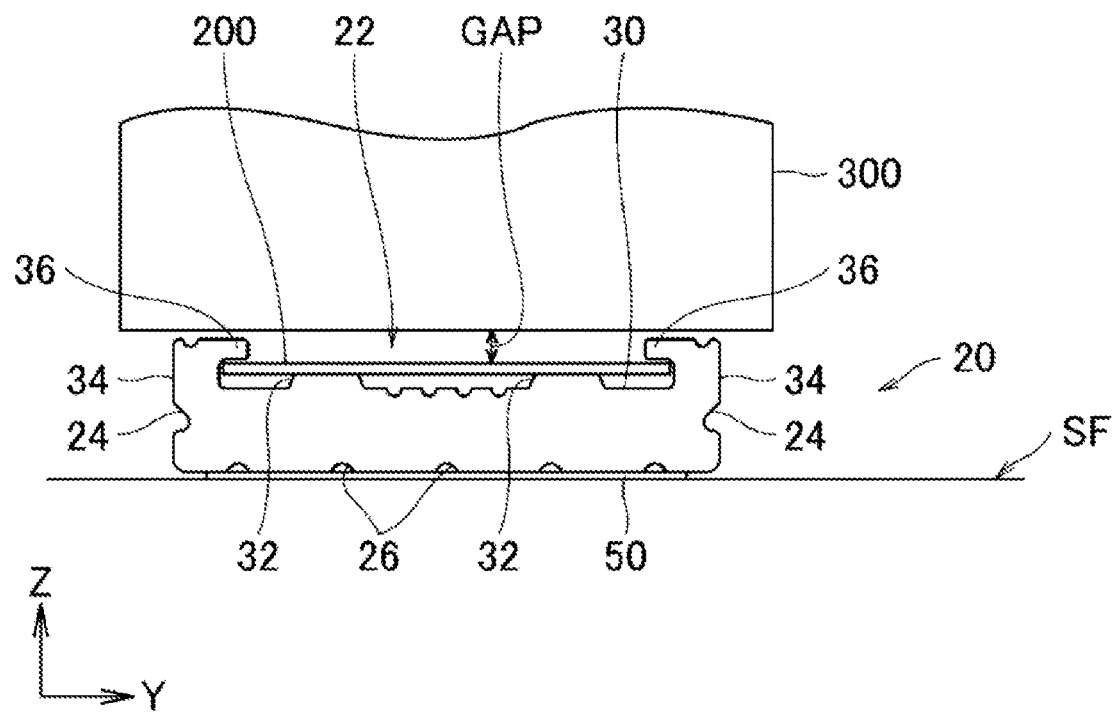
FIG. 4 is a cross-sectional view taken along IV-IV in FIG. 2.

With reference to a cross-sectional view of FIG. 4, the scale holder 20 having a rectangular cross section is manufactured through, for example, aluminum extrusion and cut out to an indented length for downsizing and weight reduction. On the front surface of the scale holder 20, a groove 22 holding the scale 200 is formed in the scale holder 20 along the lengthwise direction. In addition, on each side surface of the scale holder 20, a side surface recess 24 is formed. On the back surface of the holder, a plurality of back surface recesses 26 are disposed. To the back surface of the holder, a double-sided adhesive tape 50 is affixed, and then affixed to a certain position on the mounting surface SF, whereby the scale holder 20 is fixed to the mounting surface SF.

The detailed shape of the groove 22 is described with reference to FIG. 4. On a bottom surface 30 of the groove, two lines of the projections 32 projecting in the height direction (Z-axis direction) are disposed. The upper surface of the projection 32 is machined to be flat and the back surface of the tape scale 200 is placed thereon. On both ends of the bottom surface 30 in the widthwise direction, side walls 34 are disposed. The side wall 34 forms an inner wall surface of the groove 22. On each of the side walls 34, from its upper end toward inside in the widthwise direction, a restricting piece 36 is formed. In other words, the cross section of the holder is formed in a shape of a lay-down letter C by the bottom surface 30, the side wall 34, and the restricting piece 36. The width size of the opening of the groove 22 is represented by the gap between a pair of the restricting pieces 36. The shape of the groove 22 is symmetrical, including the two lines of the projections 32, the side walls 34, and the restricting pieces 36 on both ends, in the cross-sectional view of FIG. 4. The width of the opening of the groove 22 is smaller than the width of the tape scale 200. Therefore, the tape scale 200 can be housed only by inserting the scale 200 from the end of the holder into the groove 22 gradually along the lengthwise direction of the scale holder 20.

The tape scale 200 includes a scale base material in a tape form and an optical grating formed in a belt shape in the X direction on the front surface of the scale base material. The scale base material is made of an optically opaque material, such as a metal. The optical grating is formed by, for example, subjecting an opaque thin metal film having a high reflectance of light such as chromium formed on the scale base material to lithography processing. The tape scale 200 has flexibility and can be handled in a compact form by taking up by a reel and the like.

The width of the detection head 300 is larger than the width of the scale holder 20. The lower surface of the detection head 300 partially covers the tape scale 200 housed in the scale holder 20 in a non-contact way. On the lower surface of the detection head 300, a light inlet/outlet is provided, through which measurement light from a light source in the head is emitted toward the surface of the scale. The detection head 300 is disposed so as to have a certain value of the gap from the lower surface of the detection head 300 to the surface of the tape scale. The detection head 300 is fixed to a target object to be moved and moves along the lengthwise direction of the scale 200 with the certain value of the gap being kept. When the optical grating on the tape scale is irradiated with the light emitted from the detection head 300, the light modulated on the optical grating returns to the detection head 300 as a reflected light and is detected. A detection signal from the detection head 300 is sent through a cable 310 to a controller or the like of the mechanical device.

Figure 5:
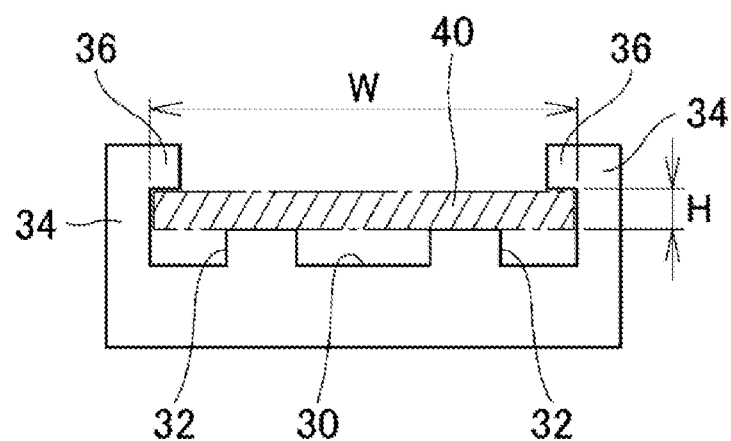
FIG. 5 is a schematic cross-sectional view illustrating a housing space of a scale holder in a scale attachment device of the linear encoder.

The hatched area in FIG. 5 is a space to house the tape scale 200 (referred to as a housing space 40). The height H of the housing space 40 is represented by a space from the projection 32 to the restricting piece 36. The width W of the housing space 40 is represented by a space between the side walls 34 on the left and right.

Figure 6A:
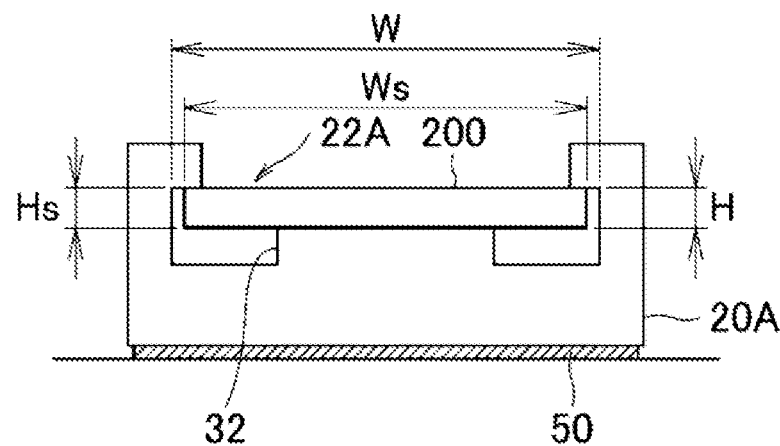
FIGS. 6A, 6B, and 6C are cross-sectional views illustrating modifications of a shape of a groove in the scale holder.
Figure 6B:
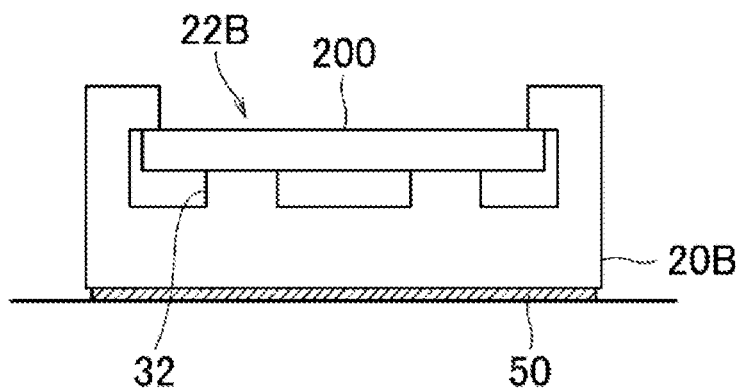
Figure 6C:
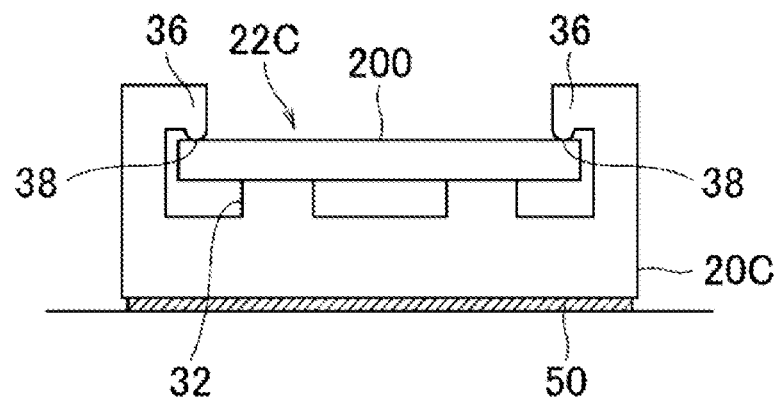

For the scale attachment device according to the embodiment, as illustrated in FIGS. 6A to 6C, scale holders 20A to 20C including grooves 22A to 22C in various specific shapes can be adopted. The width of the tape scale 200 is represented by Ws, and the thickness thereof is represented by Hs. The groove 22A illustrated in FIG. 6A has a single line of the projection 32 on the bottom surface 30. The groove 22B illustrated in FIG. 6B has two lines of the projections 32 on the bottom surface 30. Although a single line of the projection 32 may suffice, two lines of the projections 32 allow easy work for machining the upper surface of the projection 32 to have a certain degree of flatness. FIG. 6C illustrates an example in which a protrusion 38 protruding downward in the thickness direction is formed inside of each of the restricting pieces 36 on both sides, in the opening of the groove 22C. The protrusion 38 is formed to limit the amount of movement of the tape scale 200 in the thickness direction to a certain value. These various shapes of the groove restrict the amount of movement of the tape scale 200 in the thickness direction so as to make the amount of movement equal to or smaller than a gap tolerance value of the detection head. Providing the protrusion 38 allows easier work for forming a clearance in the thickness direction to an intended size.

Figure 7:
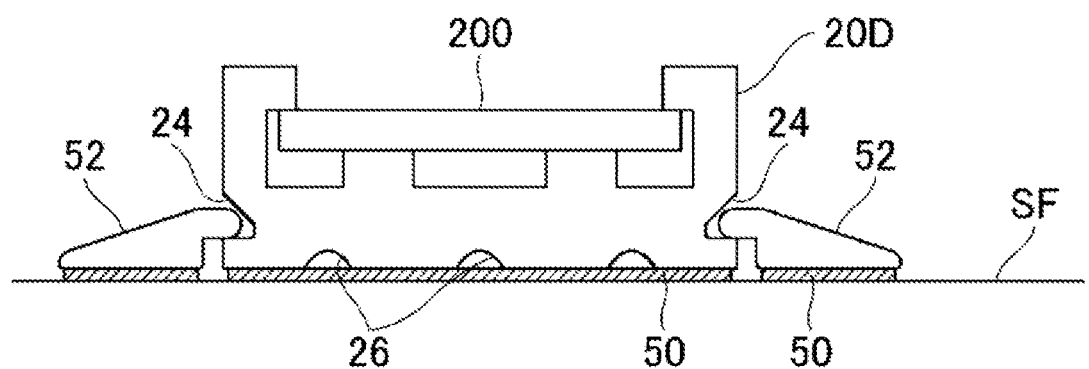
FIG. 7 is a cross-sectional of an example in which an anti-peel fitting is applied to the scale holder.

FIG. 7 illustrates a configuration of an anti-peel fitting 52 making use of the side surface recess 24 of the scale holder. The anti-peel fitting 52 is disposed on both sides of the holder 20D, and fixed to the mounting surface SF with the double-sided adhesive tape 50. The anti-peel fitting 52 includes a locking piece protruding toward the side surface of the holder 20D. The anti-peel fitting 52 is fixed by the locking piece of being engaged with the side surface recess 24. This configuration enhances the functionality of preventing peel of the scale holder 20D. FIGS. 1 and 2A to 2C illustrate an attachment device for a tape scale having a relatively small length. According to the scope of application of the scale attachment device according to the embodiment of the invention, a scale holder having a length ranged from 0.5 to 10 m may be used, and preferably a scale holder having a length ranged from 2 to 6 m may be used. In addition, a plurality of scale holders may be used for one side of the central fixing block, disposed in a row with a gap provided between the scale holders.

Figure 8:
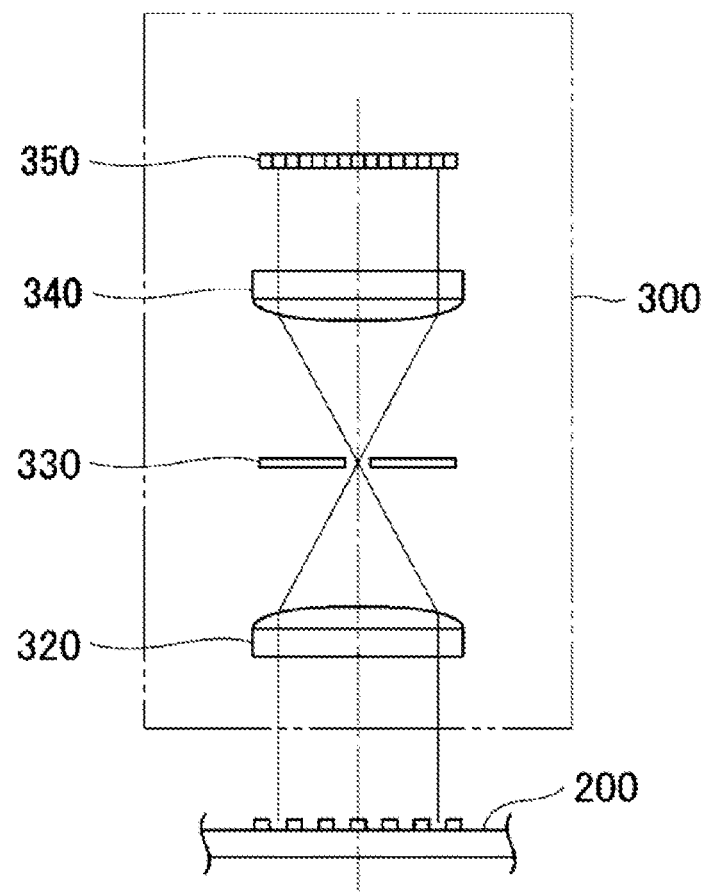
FIG. 8 is a view illustrating an optical configuration of a detection head appropriate for the linear encoder.

FIG. 8 illustrates an example of an optical configuration of the detection head 300 appropriate for the embodiment. The light receiving system of the detection head 300 includes a scale-side lens 320, an aperture 330, a detection-side lens 340, and a light receiving element array 350 disposed on a common optical axis, which constitute a both-side telecentric optical system. In the both-side telecentric optical system, the two lenses 320 and 340 are disposed in front and back of the aperture 330 such that the light from each of the two lenses comes into a focus at the position of the aperture 330. As illustrated in FIG. 8, the parallel light from the scale side is condensed by the lens 320 to the aperture 330. The light that has passed through the aperture 330 is collimated again by the lens 340 and then output as a parallel light. In addition, in the detection head 300, an irradiation optical system that irradiates the surface of the scale with the light from the light source, which is not illustrated in the diagram, is provided. This irradiation optical system may be used in combination with the lens 320 to irradiate the surface of the scale with the light from the light source. As described above, the detection head 300 is included in the both-side telecentric optical system in which a large depth of focus is obtained. This has an advantage that when installing the scale to the target machine, an exact alignment of the scale especially in the thickness direction is not required. Therefore, ensuring the straightness of the scale by applying a tension with a tension device to minimize the displacement of the scale in the thickness direction like in conventional art is no longer required. In the scale attachment device according to the embodiment, the scale can be held without tension, thereby extending the scope of application of the linear encoder.

Here, the installation procedure of the linear encoder illustrated in FIGS. 2A and 2B is described. Firstly, dispose the fixing base 12 of the fixing block 10 and two scale holders 20 on the mounting surface SF in a row and fix each of them to the mounting surface SF. Insert an end of the tape scale 200 in the lengthwise direction from an end of the scale holder 20 into the groove to house the scale 200 into the housing space. Next, dispose the holding member 14 side by side with the fixing base 12, and then fix the holding member 14 so as to press one edge part around the center of the tape scale 200 in the lengthwise direction onto the mounting surface SF. Installation of the tape scale 200 is completed with such a simple procedure.

The following describes advantageous effects of the embodiment.

(1) In FIG. 2, as for the tape scale 200, the central part in the lengthwise direction is fixed with the fixing block 10, and both side parts of the central part are only housed into the scale holder 20 but not fixed. Therefore, in comparison with attaching the whole of the back surface of the tape scale to the target object with the double-sided adhesive tape or the like, fixing only the central part of the scale using the scale attachment device 100 according to the embodiment of the invention allows easy removal work of the scale later.

(2) The scale attachment device 100 simply includes the fixing block 10 that fixes a central part of the tape scale 200 in the lengthwise direction and the scale holder 20 that houses both side parts thereof. The components are simple and the number of part items is small.

(3) The installation worker disposes the scale holder 20 on both sides of the fixing block 10, inserts the tape scale 200 into the groove 22 on one side of the scale holder 20, then lets the tape scale 200 pass through via the upper surface of the fixing base 12, and inserts the tape scale 200 into the groove 22 on the other side of the scale holder 20. Subsequently, presses the central part of the tape scale 200 placed on the fixing base 12 with the holding member 14 to fix the scale 200. To remove the tape scale 200, the procedure is followed in reverse order. With the simple procedure like this, the installation work and removal work are each achieved in a short time.

(4) As illustrated in FIGS. 6A to 6C, the clearance (H—Hs) of the tape scale 200 in the thickness direction in the housing space can be determined to be equal to or smaller than a value of gap variation (gap tolerance) acceptable for the detection head 300. This configuration reduces rattling of the housed scale in the thickness direction due to the shape of the groove 22 to generate, even in maximum, only rattling with a value equal to or smaller than a value of the gap tolerance. The output variation of the detection head 300 is reduced to be small, thereby achieving high precision measurement of the linear encoder. For the minimum value of the clearance (H—Hs) in the thickness direction, at least a value equal to or larger than 0.01 mm is secured, whereby easiness of insertion of the tape scale 200 into the groove 22 is secured.

(5) In the housing space 40, movement of the tape scale 200 in the lengthwise direction is not restricted. Displacement resulting from thermal expansion of the scale 200 increases as the distance from the fixing block 10 increases. For the effect of the thermal expansion of the scale 200 on the output variation, simply provide a correction value to an output value of the detection head 300 for each scale material. The correction for the thermal expansion like this can be achieved accurately with the state in which the tape scale 200 is movable to the scale holder 20 in the lengthwise direction.

(6) As illustrated in FIG. 1, the central part of the tape scale 200 in the lengthwise direction is fixed to the mounting surface SF. For absolute linear encoders, the origin of the scale is often determined to be the center. According to this configuration, the fixed part of the scale 200 and the origin of the scale are easily matched, which minimizes misalignment of the origin resulting from thermal expansion or the like.

(7) As illustrated in FIG. 4, fixing the scale holder 20 to the mounting surface SF with the double-sided adhesive tape 50 substantially reduces the thickness of the holder. In addition, because the double-sided adhesive tape 50 has elasticity in its adhesive layer, even if some irregularities remain on the surface of the mounting surface SF on the mechanical device side or the back surface of the scale holder 20, the adhesive layer absorbs the effect of the irregularities, whereby the flatness and the straightness of the scale holder 20 are secured.

(8) As illustrated in FIG. 4, the back surface recesses 26 formed on the back surface of the scale holder 20 help remove the air bubbles that come into when affixing the double-sided adhesive tape 50.

(9) As illustrated in FIG. 8, configuring the light receiving system of the detection head 300 to be both-side telecentric makes the gap tolerance of the detection head 300 to be a relatively large value, whereby rattling of the tape scale 200 is easily reduced with the scale holder 20. Some of the detection heads in the telecentric optical system have a gap tolerance of ±0.1 mm for a gap of 2 mm. When this is applied to the embodiment of the invention, the clearance of the housing space 40 in the thickness direction of the scale holder 20 is simply determined to be a value equal to or smaller than 0.2 mm. Because this clearance has a relatively large value, easy insertion work of the scale to the holder 20 is achieved.

INDUSTRIAL APPLICABILITY

The scale attachment device according to the embodiment of the invention is applied to an incremental or absolute linear encoder based on various types of detection principles such as photoelectric and capacitance technologies.

REFERENCE SIGNS LIST

10 FIXING BLOCK (FIXING MEMBER)
20 SCALE HOLDER (HOUSING MEMBER)
22 GROOVE
24 SIDE SURFACE RECESS
26 BACK SURFACE RECESS
40 HOUSING SPACE
50 DOUBLE-SIDED ADHESIVE TAPE
52 ANTI-PEEL FITTING
100 SCALE ATTACHMENT DEVICE
200 TAPE SCALE
300 DETECTION HEAD
320 SCALE-SIDE LENS
330 APERTURE
340 DETECTION-SIDE LENS
350 LIGHT RECEIVING ELEMENT ARRAY

The invention claimed is:

1. A scale attachment device to attach a tape scale for a linear encoder to a target object, the scale attachment device comprising:
a fixing member configured to fix a part of the tape scale in a lengthwise direction by pressing the part of the tape scale onto the target object; and
a housing member including a groove configured to house a remaining part of the tape scale, wherein
the housing member is disposed next to the fixing member;
the tape scale is inserted into the groove in the lengthwise direction with a back surface of the tape scale facing a bottom surface of the groove, and thus housed in the groove without receiving any tension in the lengthwise direction;
a width dimension of an opening of the groove is smaller than a width dimension of the tape scale; and
with a state in which the tape scale is housed in a housing space inside of the groove, a clearance value of the tape scale in a thickness direction is equal to or smaller than a value of gap variation acceptable for a detection head for the linear encoder, and the clearance value of the tape scale in a widthwise direction is equal to or larger than 0.1 mm.

2. The scale attachment device according to claim 1, wherein
the fixing member is configured to fix at least a part in a central part of the tape scale; and
the housing member is disposed on both sides of the fixing member to house both side parts of the tape scale, and adhered and fixed to the target object with a double-sided adhesive tape.

3. The scale attachment device according to claim 2, wherein on a back surface of the housing member, a plurality of back surface recesses are disposed in parallel to each other in the lengthwise direction of the groove.

4. The scale attachment device according to claim 1, wherein on a side surface of the housing member, a side surface recess is disposed in the lengthwise direction of the groove.

5. A linear encoder comprising:
a tape scale attached to a target object with the scale attachment device according to claim 1; and
a detection head configured to read an optical grating on the tape scale, wherein the detection head constitutes a telecentric optical system, the detection head including:
a lens facing the optical grating;
an aperture disposed on a focal position of the lens; and
a light receiving element array configured to receive a detected light passed through the lens and the aperture.

6. The scale attachment device according to claim 1, wherein the housing member includes:
two side walls separated by the groove in the widthwise direction; and
two restriction pieces defining the opening of the groove, each of the restriction pieces being integrally coupled to a respective one of the side walls and protruding toward inwardly in the widthwise direction.

7. The scale attachment device according to claim 1, wherein the housing member includes first and second side surfaces, the first side surface including a first side surface recess disposed in the lengthwise direction, and the second side surface including a second side surface recess disposed in the lengthwise direction.

8. The scale attachment device according to claim 7, further comprising first and second anti-peeling fittings, the first anti-peeling fitting including a locking piece which is engaged with the first side surface recess, and the second anti-peeling fitting including a locking piece which is engaged with the second side surface recess.

* * * * *